US012634987B2

(12) United States Patent
Kishida et al.

(10) Patent No.: US 12,634,987 B2
(45) Date of Patent: May 19, 2026

(54) TERMINAL APPARATUS, COMMUNICATION METHOD, AND COMMUNICATION PROGRAM

(71) Applicant: NTT, Inc., Tokyo (JP)

(72) Inventors: Akira Kishida, Musashino (JP); Yasuhiko Inoue, Musashino (JP); Kengo Nagata, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 395 days.

(21) Appl. No.: 17/910,881

(22) PCT Filed: Mar. 17, 2020

(86) PCT No.: PCT/JP2020/011813
§ 371 (c)(1),
(2) Date: Sep. 12, 2022

(87) PCT Pub. No.: WO2021/186585
PCT Pub. Date: Sep. 23, 2021

(65) Prior Publication Data
US 2023/0104897 A1      Apr. 6, 2023

(51) Int. Cl.
*H04W 74/0808*      (2024.01)
(52) U.S. Cl.
CPC ............................... *H04W 74/0808* (2013.01)
(58) Field of Classification Search
CPC ................................................ H04W 74/0808
See application file for complete search history.

(56) References Cited

U.S. PATENT DOCUMENTS

| | | | |
|---|---|---|---|
| 6,799,054 B2 * | 9/2004 | Shpak | H04W 84/12 |
| | | | 455/526 |
| 8,953,675 B2 * | 2/2015 | Laan | A63F 13/533 |
| | | | 375/240.1 |
| 11,716,784 B2 * | 8/2023 | Xin | H04W 4/70 |
| | | | 370/329 |

(Continued)

FOREIGN PATENT DOCUMENTS

| | | |
|---|---|---|
| CN | 110234172 A | 9/2019 |
| JP | 2005-151359 A | 6/2005 |

(Continued)

OTHER PUBLICATIONS

IEEE Std 802. Nov. 2016, "10.22.2 HCF contention based channel access (EDCA)", Dec. 7, 2016.

(Continued)

*Primary Examiner* — Parth Patel
(74) *Attorney, Agent, or Firm* — Harness, Dickey & Pierce, P.L.C.

(57) ABSTRACT

A terminal (20) includes a transmission control unit (203). The transmission control unit (20) sets a plurality of LL transmission queues (113_LL1, 113_LL2, 113_LL3), into each of which is input low latency data, regarding which latency conditions relating to latency are stricter than predetermined latency conditions. The latency conditions demanded of the low latency data that is input are different from each other among the plurality of LL transmission queues (113_LL1, 113_LL2, 113_LL3).

5 Claims, 8 Drawing Sheets

(56)                    References Cited

U.S. PATENT DOCUMENTS

| | | | | |
|---|---|---|---|---|
| 2014/0146682 | A1* | 5/2014 | Kakadia | H04L 47/805 |
| | | | | 370/238 |
| 2018/0131614 | A1 | 5/2018 | Song | |
| 2020/0053018 | A1* | 2/2020 | White | H04L 47/6275 |
| 2020/0145345 | A1* | 5/2020 | Finkelstein | H04L 47/58 |
| 2021/0076249 | A1* | 3/2021 | Hsu | H04W 28/0236 |
| 2021/0076420 | A1* | 3/2021 | Xin | H04L 49/206 |
| 2021/0119941 | A1* | 4/2021 | Hoole | H04W 40/12 |
| 2021/0321454 | A1 | 10/2021 | Hao et al. | |
| 2022/0159718 | A1* | 5/2022 | Fang | H04W 74/0808 |
| 2022/0272580 | A1* | 8/2022 | Kim | H04L 1/00 |
| 2022/0279587 | A1* | 9/2022 | Kim | H04W 28/10 |
| 2022/0295332 | A1* | 9/2022 | Kim | H04W 28/0215 |
| 2022/0330096 | A1* | 10/2022 | Kim | H04W 72/54 |
| 2022/0330344 | A1* | 10/2022 | Lou | H04L 5/0055 |
| 2023/0104897 | A1* | 4/2023 | Kishida | H04L 47/2441 |
| | | | | 370/329 |

FOREIGN PATENT DOCUMENTS

| | | | |
|---|---|---|---|
| JP | 2015-192195 | A | 11/2015 |
| JP | 2016-58943 | A | 4/2016 |
| WO | WO-2009046143 | A2 | 4/2009 |

OTHER PUBLICATIONS

International Search Report (Japanese and English) and Written Opinion (Japanese) of the ISA issued in PCT/JP2020/011813, mailed Aug. 4, 2020; ISA/JP.

Kim, Suhwook et al., "Latency enhancement for EHT", doc.: IEEE 802.11-19/1524r0, dated Sep. 16, 2019.

* cited by examiner

FROM DATA PROCESSING UNIT 201

203

211

DATA CATEGORIZING UNIT

213_LL1 213_LL2 213_LL3 213_VO 213_VI 213_BE 213_BK

212_VO 212_VI 212_BE 212_BK

212_LL

DATA COLLISION
MANAGEMENT UNIT    215

TO WIRELESS SIGNAL PROCESSING UNIT 202

TERMINAL APPARATUS, COMMUNICATION METHOD, AND COMMUNICATION PROGRAM

CROSS-REFERENCE TO RELATED APPLICATIONS

This application is a 371 U.S. National Phase of International Application No. PCT/JP2020/011813 filed on Mar. 17, 2020. The entire disclosures of the above applications are incorporated herein by reference.

TECHNICAL FIELD

An embodiment relates to a terminal apparatus, a communication method, and a communication program.

BACKGROUND ART

A wireless LAN access point and a terminal access a channel using CSMA/CA (Carrier Sense Multiple Access with Collision Avoidance) to transmit wireless signals. In CSMA/CA, the access point and terminal stand by for an amount of time defined by an access parameter, and transmit wireless signals upon having confirmed by carrier sense that the channel is not in use by another terminal or the like.

One priority control format defined for wireless LAN is EDCA (Enhanced Distribution Channel Access). In EDCA, traffic (data) from a higher layer is categorized into one of four access categories (AC), which are VO (Voice), VI (Video), BE (Best effort), and BK (Background). In EDCA, data is input to a corresponding one of a VO transmission queue, VI transmission queue, BE transmission queue, and BK transmission queue, on the basis of the access category to which categorization has been performed. CSMA/CA is then performed for each access category, i.e., for each transmission queue, in EDCA. CSMA/CA access parameters are appropriated so that transmission of wireless signals is prioritized in a relative manner in the order of VO (VO transmission queue), VI (VI transmission queue), BE (BE transmission queue), and BK (BK transmission queue), in EDCA.

CITATION LIST

Non Patent Literature

[NPL 1] IEEE Std 802.11-2016, "10.22.2 HCF contention based channel access (EDCA)", 7 Dec. 2016

SUMMARY OF THE INVENTION

Technical Problem

In recent years, there has been an increase in RTA (Real-Time Application) such as video games via an Internet cloud and control applications for industrial robots, for example. In such RTAs, there is uplink data (data from the terminal to the access point) that requires real-time nature. There is a need to suppress latency in data transmission to a low level in order to realize real-time nature in data transmission.

Suppressing latency of data to a low level is possible in wireless LAN, by inputting data regarding which real-time nature is demanded, such as RTA data and so forth, in a VO transmission queue that has a relatively high degree of priority of transmission. However, in a case in which there is other VO data in the VO transmission queue, the data regarding which real-time nature is demanded is handled in the same way as other VO data. Accordingly, there is a possibility that latency may not be able to be suppressed to a low level for data regarding which real-time nature is demanded. Also, the VO transmission queue assumes accommodating VO data (voice data), and generally does not have a large queue size. Accordingly, there is a possibility that in a case of assigning large-size data regarding which real-time nature is demanded to a VO transmission queue, the queue size of the VO transmission queue will be exceeded, and the data will be discarded.

Means for Solving the Problem

A terminal according to an aspect includes a transmission control unit. The transmission control unit sets a plurality of LL transmission queues, into each of which is input low latency data, regarding which latency conditions relating to latency are stricter than predetermined latency conditions. The latency conditions demanded of the low latency data that is input are different from each other among the plurality of LL transmission queues.

Effects of the Invention

According to an embodiment, a wireless communication environment, in which latency of data regarding which real-time nature is demanded can be appropriately suppressed to a low level, can be provided.

DESCRIPTION OF EMBODIMENTS

Figure 1:
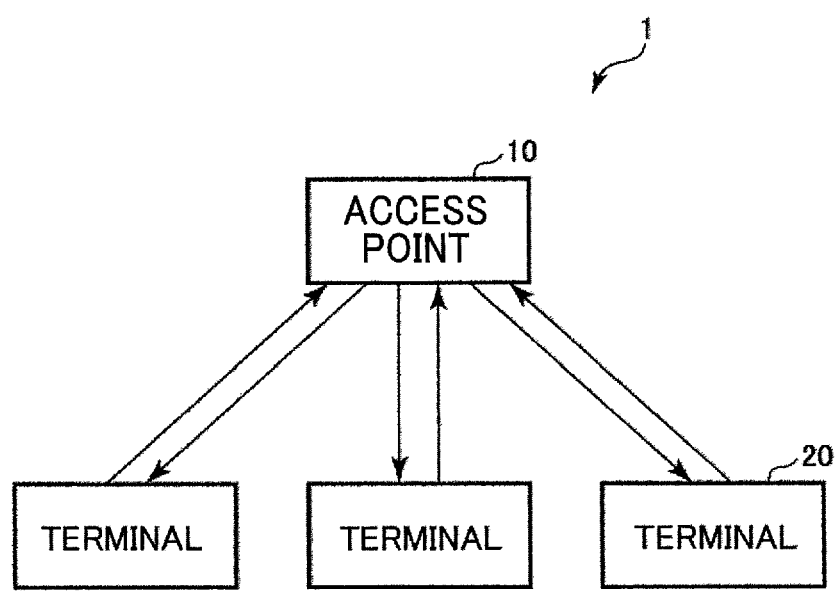
FIG. 1 is a diagram illustrating a configuration of an example of a communication system according to an embodiment.

An embodiment will be described by way of drawings below. FIG. 1 is a diagram illustrating a configuration of an example of a communication system according to the embodiment. The communication system 1 is provided with an access point (AP) 10 and terminals 20. The access point 10 performs wireless LAN communication with terminals within a service area that is set in advance. Communication may be performed among the terminals 20, although this is not illustrated in FIG. 1.

Figure 2:
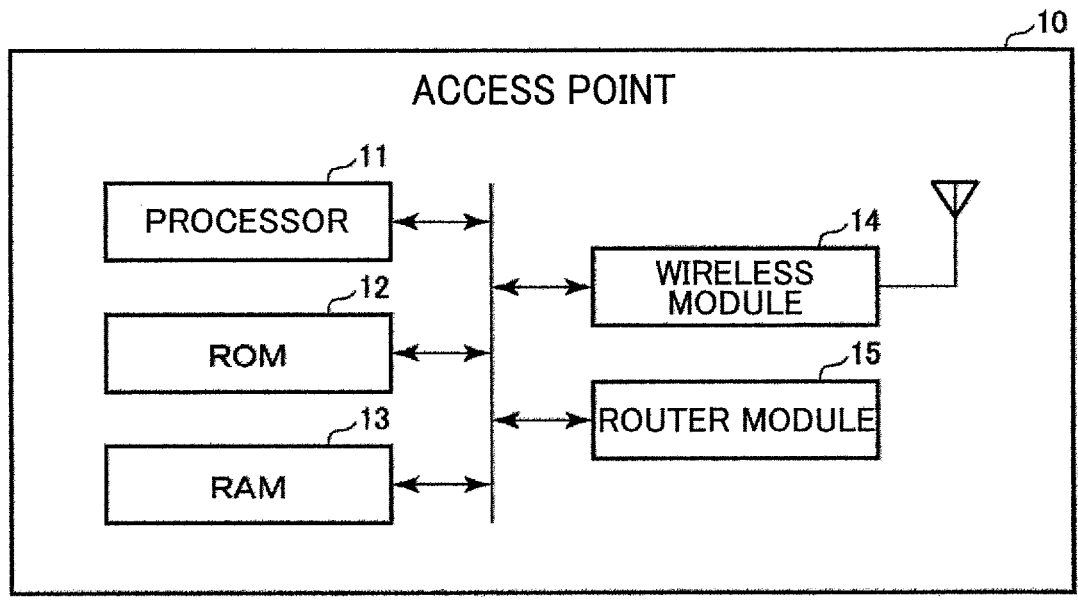
FIG. 2 is a diagram illustrating a hardware configuration of an example of an access point.

FIG. 2 is a diagram illustrating a hardware configuration of an example of the access point 10. The access point 10 is an base station for the terminal 20. The access point 10 is not limited to a fixed arrangement, and may be installed in a moving body.

The access point 10 is provided with a processor 11, ROM (Read Only Memory) 12, RAM (Random Access Memory) 13, a wireless module 14, and a router module 15.

The processor 11 is a processing device that controls the entire access point 10. The processor 11 is, for example, a CPU (Central Processing Unit). The processor 11 is not limited to being a CPU. Also, an ASIC (Application Specific IC) or the like may be used instead of a CPU. Also, the number of processors 11 may be two or more, instead of one.

The ROM 12 is a read-only storage device. The ROM 12 stores firmware and various types of programs necessary for operation of the access point 10.

The RAM 13 is a storage device that can be optionally written to. The RAM 13 is used as a work area for the processor 11, and temporarily stores firmware and so forth stored in the ROM 12.

The wireless module 14 is a module configured to perform processing necessary for wireless LAN communication. The wireless module 14 configures MAC frames from data transferred from the processor 11 for example, and converts the configured MAC frames into wireless signals which are then transmitted to the terminal 20. The wireless module 14 also receives wireless signals from the terminal 20, extracts data from the received wireless signals, and transfers the data to the processor 11, for example.

The router module 15 is provided for the access point 10 to communicate with a server that is omitted from illustration, via a network, for example. Note that the access point 10 does not necessarily have to be provided with the router module 15. The access point 10 may be configured to access a router provided externally from the access point 10, by wireless communication or wired communication, and connect to the network through this router.

Figure 3:
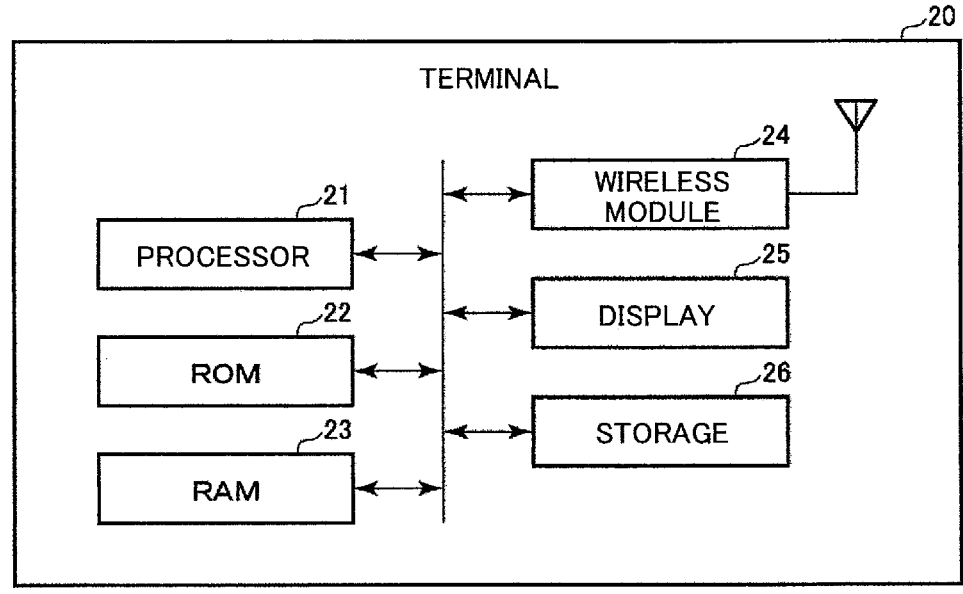
FIG. 3 is a diagram illustrating a hardware configuration of an example of a terminal.

FIG. 3 is a diagram illustrating a hardware configuration of an example of the terminal 20. The terminal 20 is a terminal device (station) such as a smartphone or the like. The terminal 20 may be a mobile terminal, or may be a terminal installed in a moving body, or may be a fixed terminal.

The terminal 20 is provided with a processor 21, ROM 22, RAM 23, a wireless module 24, a display 25, and storage 26.

The processor 21 is a processing device that controls the entire terminal 20. The processor 21 is, for example, a CPU. The processor 21 is not limited to being a CPU. Also, an ASIC or the like may be used instead of a CPU. Also, the number of processors 21 may be two or more, instead of one.

The ROM 22 is a read-only storage device. The ROM 22 stores firmware and various types of programs necessary for operation of the terminal 20.

The RAM 23 is a storage device that can be optionally written to. The RAM 23 is used as a work area for the processor 21, and temporarily stores firmware and so forth stored in the ROM 22.

The wireless module 24 is a module configured to perform processing necessary for wireless LAN communication. The wireless module 24 configures MAC frames for wireless communication from data transferred from the processor 21 for example, and converts the configured MAC frames into wireless signals which are then transmitted to the access point 10. The wireless module 24 also receives wireless signals from the access point 10, extracts data from the received wireless signals, and transfers the data to the processor 21, for example.

The display 25 is a display device that displays various types of screens. The display 25 may be a liquid crystal display, an organic EL display, or the like. Also, the display 25 may be provided with a touch panel.

The storage 26 is a storage device such as a hard disk or the like. The storage 26 stores various types of applications executed by the processor 21, for example.

Figure 4:
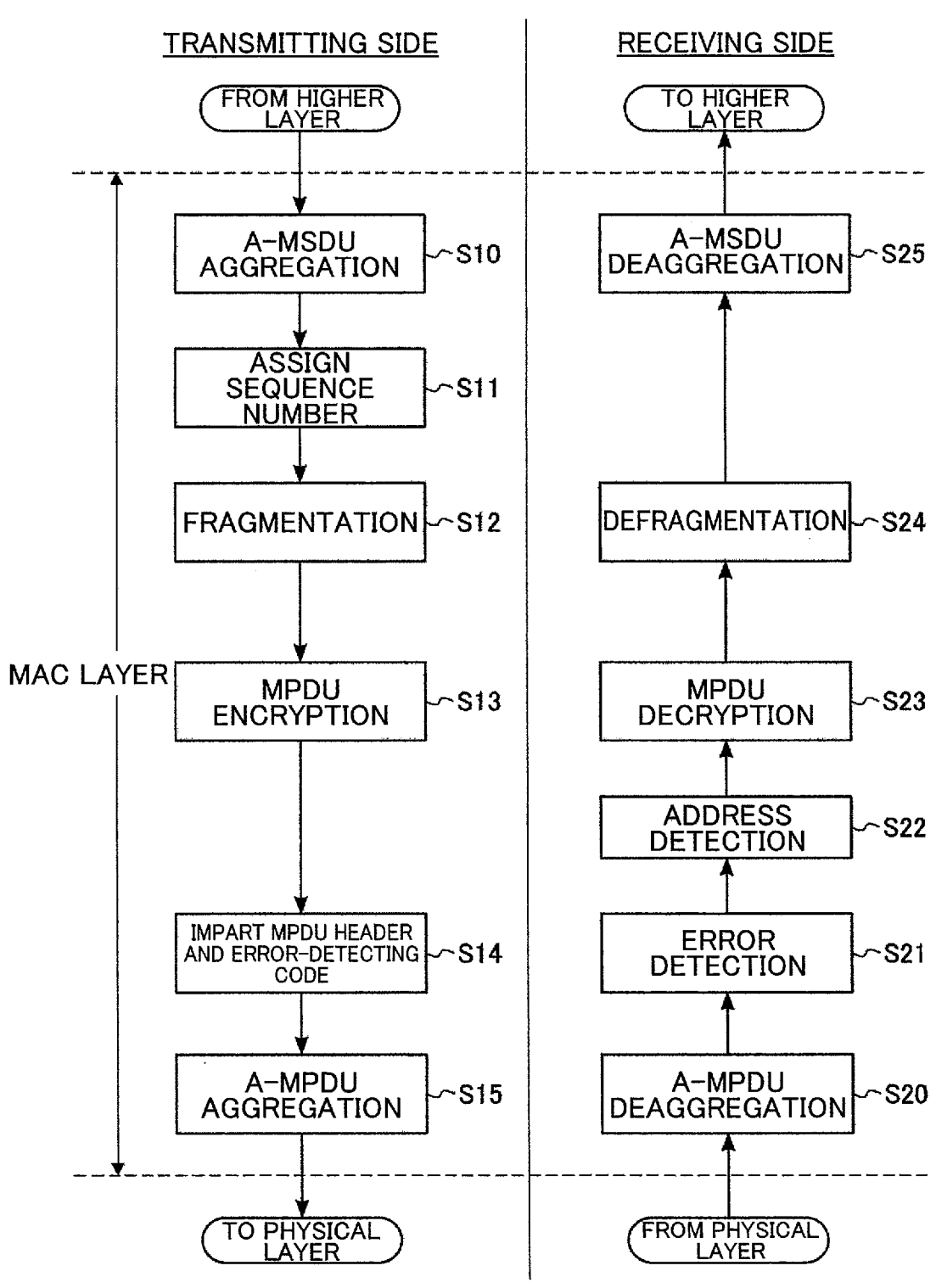
FIG. 4 is a diagram showing processing at a MAC (Media Access Control) layer in communication between the access point and the terminal.

FIG. 4 is a diagram showing processing at the MAC (Media Access Control) layer during communication between the access point 10 and the terminal 20. FIG. 4 shows both processing at the transmitting side and processing at the receiving side. When the wireless module of one of the access point 10 and the terminal 20 performs transmitting-side processing, the wireless module of the other performs receiving-side processing. In the following example, the transmitting-side and receiving-side wireless modules are described without differentiating therebetween.

First, processing at the transmitting side will be described. In step S10, the wireless module performs A-MSDU aggregation. Specifically, the wireless module links a plurality of pieces of data input from a higher layer, such as an application layer or the like, and generates an A-MSDU (Aggregate-MAC service data unit).

In step S11, the wireless module assigns a sequence number (SN) to the A-MSDU. The sequence number is a unique number for identifying the A-MSDU.

In step S12, the wireless module fragments (splits) the A-MSDU into a plurality of MPDUs (MAC protocol data unit).

In step S13, the wireless module encrypts each of the MPDUs, and generates encrypted MPDUs.

In step S14, the wireless module adds a MAC header and an error-detecting code (FCS) to each of the encrypted MPDUs. The error-detecting code is CRC (Cyclic Redundancy Check) code, for example.

In step S15, the wireless module performs A-MPDU aggregation. Specifically, the wireless module links the plurality of MPDUs, and generates an A-MPDU (Aggregate-MAC protocol data unit) as a MAC frame.

Following step S15, the wireless module performs physical layer processing on the MAC frame. That is to say, the wireless module performs modulation processing and so forth on the MAC frame to generate wireless signals, and transmits the wireless signals to the access point 10.

Next, processing at the receiving side will be described. When wireless signals are received, the wireless module performs physical layer processing to recreate the MAC frame from wireless signals. Thereafter, the wireless module performs the MAC layer processing shown in FIG. 4.

In step S20, the wireless module performs A-MPDU deaggregation. Specifically, the wireless module splits the A-MPDU into MPDU increments.

In step S21, the wireless module performs error detection. For example, the wireless module determines whether or not reception of the wireless signals has been successful by CRC. When reception of the wireless signals has failed, the wireless module may make a retransmission request. At this time, the wireless module may request retransmission in MPDU increments. Conversely, when reception of the wireless signals has been successful, the wireless module performs the next processing.

In step S22, the wireless module performs address detection. At this time, the wireless module determines whether or not the MPDU sent thereto is addressed to itself, by the address recorded in the MAC header of each of the MPDUs. When not addressed to itself, the wireless module does not perform the next processing. When addressed to itself, the wireless module performs the next processing.

In step S23, the wireless module decrypts the encrypted MPDU.

In step S24, the wireless module performs defragmentation of the MPDU. That is to say, the wireless module recreates the A-MSDU from the plurality of MPDUs.

In step S25, the wireless module performs A-MSDU deaggregation. Specifically, the wireless module recreates the data in increments of MSDUs from the A-MSDU.

Following step S25, the wireless module outputs the data to a higher layer of the MAC layer. The higher layer is an application layer, for example.

Figure 5:
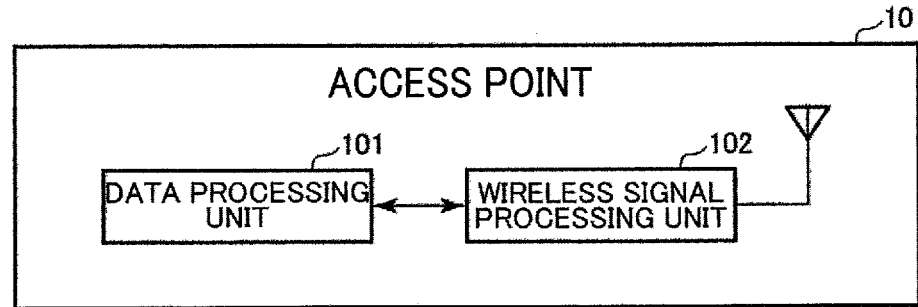
FIG. 5 is a functional block diagram of the access point.

FIG. 5 is a functional block diagram of the access point 10. The access point 10 is provided with a data processing unit 101 and a wireless signal processing unit 102. The processing of the data processing unit 101 and the wireless signal processing unit 102 is realized by the processor 11 and the wireless module 14, for example.

The data processing unit 101 configures MAC frames from data transferred from a server on a processing network, for example. The data processing unit 101 also recreates data from MAC frames transferred from the wireless signal processing unit 102.

The wireless signal processing unit 102 performs processing for transmitting or receiving wireless signals. For example, the wireless signal processing unit 102 converts MAC frames configured at the data processing unit 101 into wireless signals, and transmits the wireless signals to the terminal 20. The wireless signal processing unit 102 also receives wireless signals from the terminal 20, extracts MAC frames from the received wireless signals, and performs transfer thereof to the data processing unit 101.

Figure 6:
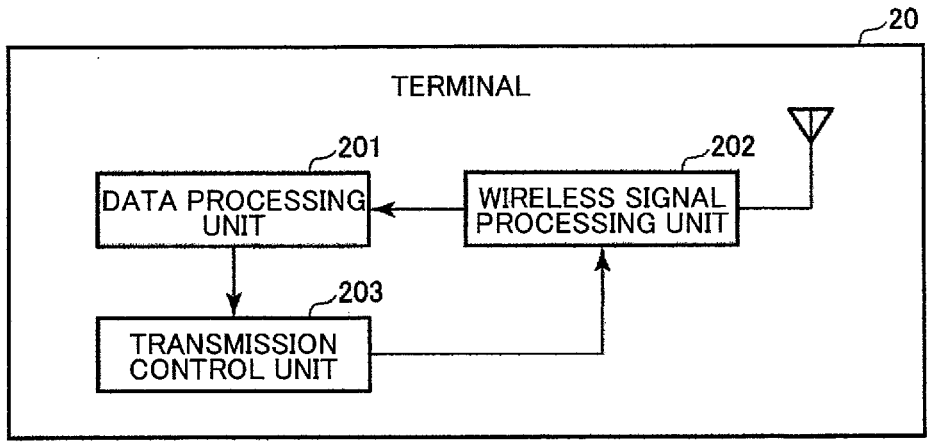
FIG. 6 is a functional block diagram of the terminal.

FIG. 6 is a functional block diagram of the terminal 20. The terminal 20 is provided with a data processing unit 201, a wireless signal processing unit 202, and a transmission control unit 203. The processing of the data processing unit 201, the wireless signal processing unit 202, and the transmission control unit 203 is realized by the processor 21 and the wireless module 24, for example.

The data processing unit 201 is capable of executing processing of, for example, an LLC (Logical Link Control) layer and processing of higher layers than LLC, and also is capable of executing part of processing of the MAC layer. The LLC layer functions as an interface between higher layers and the MAC layer. The LLC layer also adds a DSAP (Destination Service Access Point) header and an SSAP (Source Service Access Point) header and so forth to data input from a higher application for example, thereby configuring LLC packets. The data processing unit 201 also adds MAC headers to LLC packets and configures MAC frames, as part of the processing of the MAC layer. The MAC header includes a destination address, a transmission source address, a sequence number, a traffic type (TID), and error-detecting code and so forth. The data processing unit 201 also recreates data from the MAC frames transferred from the wireless signal processing unit 202. This data is used by a higher application, for example.

Now, the application is not limited to a particular application. For example, the application may be an RTA such as a video game or a control application for industrial robots.

The wireless signal processing unit 202 is capable of executing processing of the physical layer. The wireless signal processing unit 202 performs processing for transmitting or receiving wireless signals. For example, the wireless signal processing unit 202 converts MAC frames configured at the data processing unit 201 into wireless signals, and transmits the wireless signals to the access point 10, for example. At this time, the wireless signal processing unit 202 adds a preamble and a PHY header and so forth to the MAC frames prior to the conversion into the wireless signal. The wireless signal processing unit 202 also receives wireless signals from the access point 10, extracts MAC frames from the received wireless signals, and performs transfer thereof to the data processing unit 201.

Figure 7:
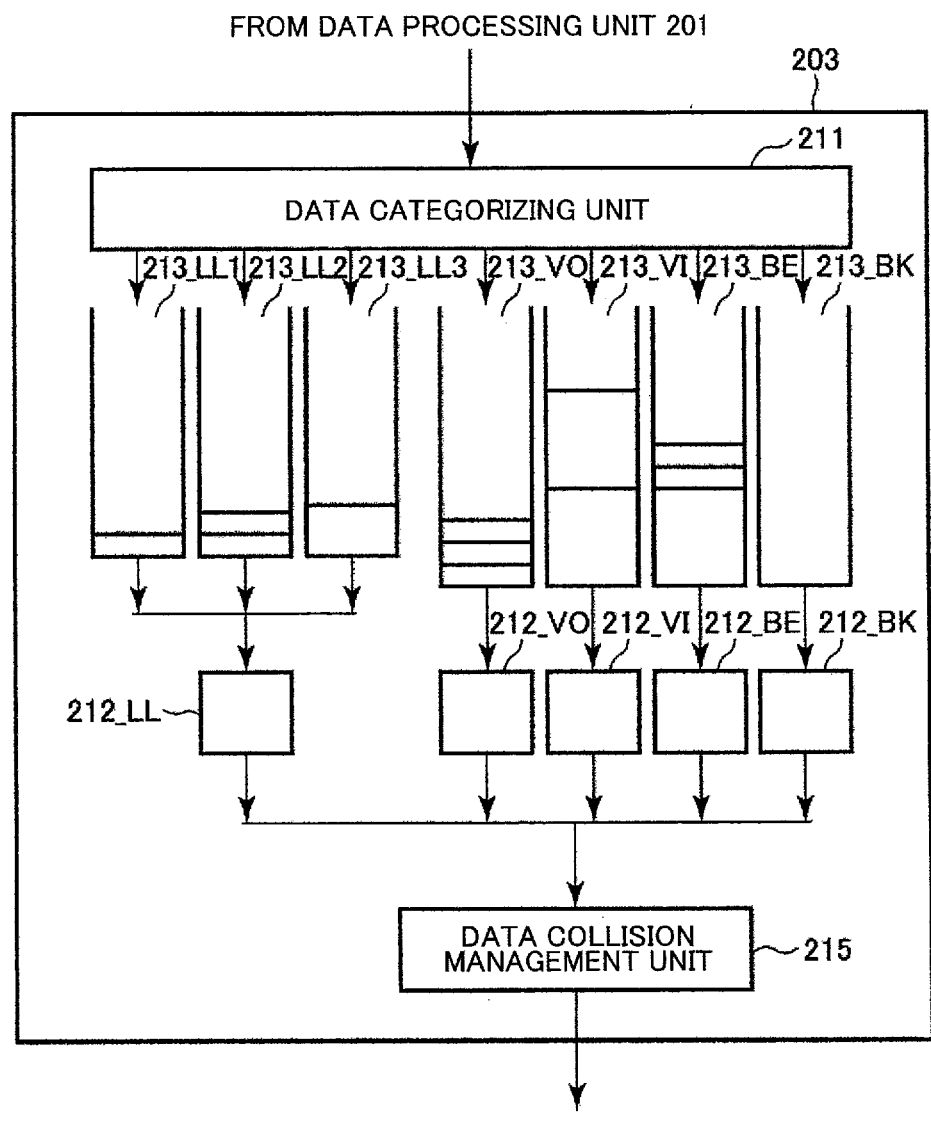
FIG. 7 is a functional block diagram of a transmission control unit of the terminal.

The transmission control unit 203 is capable of executing part of the processing of the MAC layer. FIG. 7 is a functional block diagram of the transmission control unit 203. As illustrated in FIG. 7, the transmission control unit 203 is provided with a data categorizing unit 211 and CSMA/CA execution units 212_LL, 212_VO, 212_VI, 212_BE, and 212_BK. The transmission control unit 203 also sets transmission queues 213_LL1, 213_LL2, 213_LL3, 213_VO, 213_VI, 213_BE, and 213_BK. The transmission control unit 203 controls timing of transmitting wireless signals to the access point 10 and so forth. The transmission control unit 203 controls transmission of wireless signals (data) to the access point 10 by EDCA, for example.

Data to which the data processing unit 201 has added a MAC header, i.e., MAC frames, are transferred to the data categorizing unit 211. The data categorizing unit 211 categorizes (classifies) the data (MAC frames) from the data processing unit 201. By categorizing the data, the data categorizing unit 211 distinguishes whether or not the data (MAC frames) falls under low latency data, regarding which latency conditions regarding latency are stricter than predetermined latency conditions. In one example, the predetermined latency conditions are that the demanded latency time is not greater than 100 msec. Data of which the demanded latency time is not greater than 100 msec is determined to fall under low latency data, and is categorized into LL (Low Latency). Examples of latency evaluation values used for judging latency conditions include maximum latency, average latency, percentile, variance value of latency, standard deviation of latency, and jittering and so forth.

Also, the data categorizing unit 211 determines which access category of VO (Voice), VI (Video), BE (Best effort), and BK (Background), regarding which non-low-latency data that does not fall under low latency data falls under. Accordingly, data (MAC frame) that falls under non-low-latency data is categorized into one of VO, VI, BE, and BK.

Note that latency conditions relating to latency for low latency data are stricter than predetermined latency conditions, as described earlier. That is to say, the demanded latency time is set in low latency data. Also, latency conditions for low latency data are stricter as compared to latency conditions for VO data, regarding which transmission has the highest priority out of VO, VI, BE, and BK. In one example, the demanded latency time of low latency data is shorter as compared with data categorized into VO.

The data categorizing unit 211 also categorizes (classifies) low latency data categorized into LL further into a plurality of types on the basis of latency conditions that are demanded. In the example in FIG. 7, low latency data is categorized into one of three types of LL1, LL2, and LL3. The demanded latency conditions for the low latency data categorized into LL1 are stricter than those for low latency data categorized into LL2. The demanded latency conditions for the low latency data categorized into LL2 are stricter than those for data categorized into LL3. Accordingly, the demanded latency conditions are different from each other among LL1, LL2, and LL3. In one example, data of which the demanded latency time is not greater than 100 msec is determined to fall under low latency data. Low latency data of which the demanded latency time is not greater than 1 msec is categorized into LL1, low latency data of which the demanded latency time is greater than 1 msec and not greater than 10 msec is categorized into LL2, and low latency data of which the demanded latency time is greater than 10 msec and not greater than 100 msec is categorized into LL3.

The data categorizing unit 211 performs categorization of data (MAC frame) such as described above, i.e., data mapping, on the basis of the TID of the data. Note that the TID is imparted in increments of applications (sessions) that the terminal 20 handles. Also, the data categorizing unit 211 may perform categorization of data on the basis of header information, such as a MAC header or the like. Also, the data categorizing unit 211 may perform negotiation with the access point 10 regarding data to be transmitted from the terminal 20 prior to categorizing data, and categorize the data on the basis of the negotiation results.

In a negotiation, the transmission control unit 203 of the terminal 20 generates a negotiation frame. A negotiation frame includes information relating to latency conditions demanded of low latency data, such as demanded latency time of low latency data, and so forth. The wireless signal processing unit 202 then converts the negotiation frame into wireless signals, and performs transmission thereof to the access point 10. In a case of the terminal 20 acquiring a transmission right by CSMA/CA for example, the wireless signal processing unit 202 converts the negotiation frame into wireless signals and performs transmission thereof, in the case of transmitting a negotiation frame as well. Upon the wireless signals of the negotiation frame being transmitted, the transmission control unit 203 determines whether or not a permission notification is received from the access point 10. In a case in which the terminal 20 has received a permission notification, the negotiation is complete. Conversely, in a case in which the terminal 20 does not receive a permission notification, i.e., in a case of timing out with no permission notification for a predetermined amount of time, or in a case of receiving a rejection notification, the transmission control unit 203 and the wireless signal processing unit 202 repeat transmission of the wireless signals of the negotiation frame to the access point 10.

Also, in negotiation, the wireless signal processing unit 102 of the access point 10 receives the negotiation frame from the terminal 20. The wireless signal processing unit 102 extracts information relating to the latency conditions demanded of the low latency data (e.g., demanded latency time) from the negotiation frame. The data processing unit 101 then determines whether or not the extracted latency conditions demanded of the low latency data are satisfied, on the basis of the current communication state and so forth. In a case in which the demanded latency conditions are not satisfied, the data processing unit 101 and the wireless signal processing unit 102 of the access point 10 transmit a rejection notification, indicating that communication that satisfies the demanded latency conditions cannot be performed, to the terminal 20. Conversely, a case in which the demanded latency conditions are satisfied, the data processing unit 101 and the wireless signal processing unit 102 of the access point 10 transmit a permission notification, indicating that communication satisfying the demanded latency conditions can be secured, to the terminal 20. Note that the access point 10 may request transmission of an ACK as to the permission notification. Thus, the negotiation is completed.

On the basis of the categorization results of the data, the data categorizing unit 211 inputs the data (MAC frame) into one of the transmission queues 213_LL1, 213_LL2, 213_LL3, 213_VO, 213_VI, 213_BE, and 213_BK. A MAC frame categorized into VO is input to the transmission queue 213_VO, and a MAC frame categorized into VI is input to the transmission queue 213_VI. A MAC frame categorized into BE is then input to the transmission queue 213_BE, and a MAC frame categorized into BK is input to the transmission queue 213_BK. Thus, non-low-latency data is input to a corresponding one of transmission queues 213_VO, 213_VI, 213_BE, and 213_BK, which are non-LL transmission queues.

Also, a MAC frame categorized (mapped) into LL1 is input to the transmission queue 213_LL1, a MAC frame categorized into LL2 is input to the transmission queue 213_LL2, and a MAC frame categorized into LL3 is input to the transmission queue 213_LL3. Accordingly, low latency data is input to a corresponding one of transmission queues 213_LL1, 213_LL2, and 213_LL3, which are LL transmission queues. Also, the low latency data is input to a corresponding one of the plurality of LL transmission queues as described above, and accordingly the latency conditions demanded for the input low latency data differ among the transmission queues 213_LL1, 213_LL2, and 213_LL3. That is to say, demanded latency conditions are strict in the order of transmission queues 213_LL1, 213_LL2, and 213LL_3.

The CSMA/CA execution unit 212_VO performs CSMA/CA on the data (MAC frame) held in the transmission queue 213_VO, and the CSMA/CA execution unit 212_VI performs CSMA/CA on the data held in the transmission queue 213_VI. Also, the CSMA/CA execution unit 212_BE performs CSMA/CA on the data held in the transmission queue 213_BE, and the CSMA/CA execution unit 212_BK performs CSMA/CA on the data held in the transmission queue 213_BK. Accordingly, CSMA/CA is performed for non-low-latency data, for each of the transmission queues 213_VO, 213_VI, 213_BE, and 213_BK, which are non-LL transmission queues.

In CSMA/CA, the CSMA/CA execution units 212_VO, 212_VI, 212_BE, and 212_BK each wait for transmission for an amount of time defined by the set access parameters, while confirming by carrier sense that no transmission of wireless signals is being performed by another terminal or the like. The CSMA/CA execution units 212_VO, 212_VI, 212_BE, and 212_BK then each take out a MAC frame from one of the corresponding non-LL transmission queue, and output the MAC frame that is taken out to the wireless signal processing unit 202. Wireless signals are then transmitted from the wireless signal processing unit 202 in the same way as described above, using a channel regarding which a transmission right has been acquired through CSMA/CA.

Now, the access parameters may be assigned in a state in which transmission of wireless signals is prioritized in a relative manner in the order of VO, VI, BE, and BK. The access parameters may include CWmin, CWmax, AIFS, and TXOPLimit. CWmin is the minimum value of a CW (Contention Window) that is the transmission wait time, and CWmax is the maximum value of the CW. The shorter the CWmin and CWmax are, the easier it is for the transmission queue to obtain a transmission right. AIFS (Arbitration Inter Frame Space) is a transmission interval of wireless signals. The smaller that AIFS is, the higher the degree of priority of the transmission queue is. TXOPLimit is the upper limit value of TXOP (Transmission Opportunity), which is the time of occupying the channel. The greater the value of TXOPLimit is, the greater amount of data (wireless signals) can be transmitted with a single transmission right.

The CSMA/CA execution unit 212_LL performs CSMA/CA regarding the data (MAC frame) held in the transmission queues 213_LL1, 213_LL2, and 213_LL3, i.e., the low latency data held in the plurality of LL transmission queues.

The CSMA/CA execution unit 212_LL performs CSMA/CA in the same way as with the CSMA/CA execution units 212_VO, 212_VI, 212_BE, 212_BK, and so forth. The access parameters for CSMA/CA regarding the LL transmission queues are assigned in a state in which transmission of low latency data is relatively prioritized over transmission of non-low-latency data. That is to say, access parameters are assigned in a state in which transmission of LL wireless signals is prioritized in a relative manner over any of VO, VI, BE, and BK.

Upon acquiring a transmission right on a certain channel by CSMA/CA, the CSMA/CA execution unit 212_LL takes out a MAC frame (low latency data) from a corresponding one of the transmission queues 213_LL1, 213_LL2, and 213_LL3, and outputs the MAC frame that is taken out to the wireless signal processing unit 202. In one example, the CSMA/CA execution unit 212_LL decides an LL transmission queue from which low latency data is to be taken out by round robin, with regard to the low latency data stored in each of the transmission queues 213_LL1, 213_LL2, and 213_LL3, and decides the timing for transmitting the low latency data. In this case, MAC frames are taken out from each of the transmission queues 213_LL1, 213_LL2, and 213_LL3 in order by round robin. In a case in which low latency data is to be taken out by round robin, the demanded latency time of data from the transmission queues 213_LL1, 213_LL2, and 213_LL3 may be weighted. For example, weighting is performed such that the transmission queues 213_LL1, 213_LL2, and 213_LL3 are in order of strictness of demanded latency time. Also, control may be performed such that, each time a transmission right for a channel is acquired by CSMA/CA, the round robin is always started from the transmission queue of which the demanded latency time is the strictest.

Also, in a different example, the CSMA/CA execution unit 212_LL decides transmission timing for the low latency data stored in each of the transmission queues 213_LL1, 213_LL2, and 213_LL3 so as to satisfy latency conditions demanded regarding each of the low latency data input to the LL transmission queues. In this case, for example, CSMA/CA execution unit 212_LL acquires a demanded latency time $\alpha 1$ and an input point-in-time $\alpha 2$ with regard to a corresponding one of LL transmission queues for each of the low latency data. The CSMA/CA execution unit 212_LL then computes $(\alpha 1-(\alpha 3-\alpha 2))$ using a current point-in-time $\alpha 3$, thereby calculating a remaining time $\varepsilon$. The CSMA/CA execution unit 212_LL sets the degree of priority for the low latency data stored in each of the transmission queues 213_LL1, 213_LL2, and 213_LL3, on the basis of the remaining time $\varepsilon$. The low latency data is then taken out in order of the degree of highness of the priority set. For example, the shorter the remaining time $\varepsilon$ is, the higher the degree of priority is set.

The transmission control unit 203 may also be provided with a data collision management unit 215. In the present embodiment, the CSMA/CA execution units 212_LL, 212_VO, 212_VI, 212_BE, and 212_BK each perform CSMA/CA, as described above. Accordingly, there is a possibility of any two or more of the CSMA/CA execution units 212_LL, 212_VO, 212_VI, 212_BE, and 212_BK acquiring a transmission right on the same channel in CSMA/CA. The data collision management unit 215 adjusts the timing of transmitting data in a case in which a plurality of CSMA/CA execution units acquire transmission rights on the same channel, thereby preventing data collision.

For example, there are instances in which a channel regarding which a transmission right of an LL transmission queue acquired by CSMA/CA is the same as a channel regarding which a transmission right of one of the non-LL transmission queues acquired by CSMA/CA. In such a case, the data collision management unit 215 causes MAC frames to be taken out from the transmission queues 213_LL1, 213_LL2, and 213_LL3 with priority. Accordingly, the low latency data stored in LL transmission queues is output to the wireless signal processing unit 212 with priority, and low latency data is transmitted as wireless signals with propriety on the channel regarding which the transmission right is acquired. Meanwhile, the data collision management unit 215 causes taking out of MAC frames from non-LL transmission queues to stand by. Accordingly, the non-low-latency data stored in the non-LL transmission queues is not output to the wireless signal processing unit 202, and transmission of the non-low-latency data on the channel regarding which the transmission right is acquired stands by. In this case, the non-low-latency data is transmitted after the transmission of the low latency data is completed, for example. Collision among data being transmitted is prevented by the data collision management unit 215 performing processing such as described above.

Also, in a case in which there is low latency data in one of the LL transmission queues, and CSMA/CA for non-low-latency data acquires a transmission right before CSMA/CA for low latency data, the data collision management unit 215 may transmit the low latency data before the non-low-latency data. That is to say, transfer of transmission rights may be performed among CSMA/CA for non-low-latency data and CSMA/CA for low latency data. In this case, the TXOP periods may be set such that transmission is consecutively performed in the order of low latency data and non-low-latency data, for example.

Figure 8:
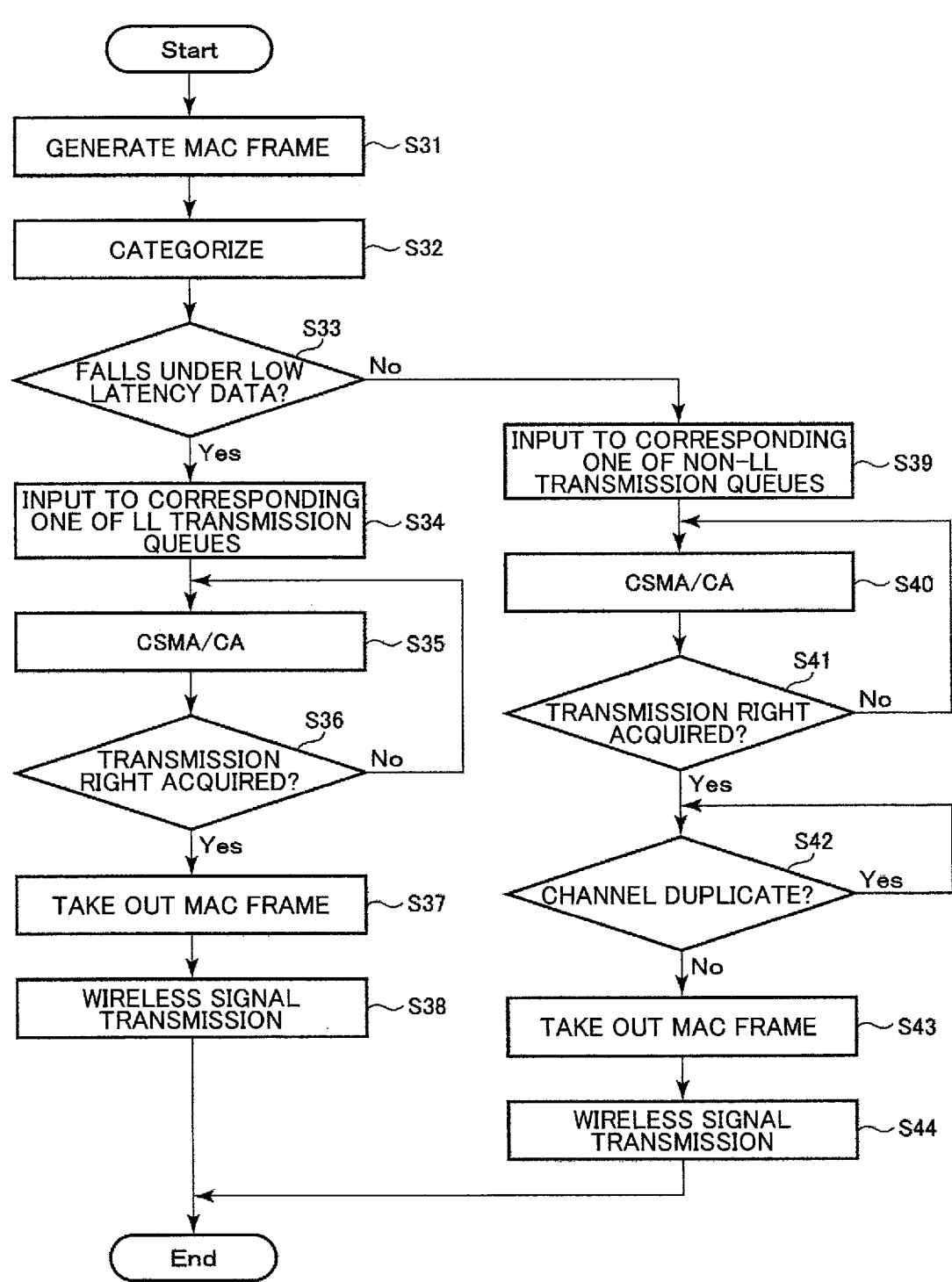
FIG. 8 is a flowchart showing an example of transmission processing at the terminal.

Next, operations of the communication system 1 will be described. In the following description, the terminal 20 transmits wireless signals, and the access point 10 receives wireless signals. FIG. 8 is a flowchart showing an example of transmission processing at the terminal 20. FIG. 8 shows processing that the data processing unit 201, the wireless signal processing unit 202, and the transmission control unit 203 and so forth perform with regard to data in a case in which the data to be transmitted is input to the data processing unit 201 from a higher layer such as an application layer or the like.

In step S31, the data processing unit 201 performs the MAC layer processing shown in FIG. 4 with regard to the input data, an generates a MAC frame. The data processing unit 201 outputs the MAC frame to the transmission control unit 203.

In step S32, the data categorizing unit 211 of the transmission control unit 203 categorizes the MAC frame (data). Then in step S33, the data categorizing unit 211 determines whether or not the MAC frame falls under low latency data, on the basis of the results of categorizing. Which of VO, VI, BE, BK, LL1, LL2, and LL3 the MAC frame falls under is also judged in the categorization of the MAC frame. In a case in which the MAC frame falls under low latency data, the processing advances to step S34. Conversely, in a case in which the MAC frame is not low latency data, i.e., falls under non-low-latency data, the processing advances to step S39.

In step S34, the data categorizing unit 211 inputs the MAC frame to a corresponding one of the transmission queues 213_LL1, 213_LL2, and 213_LL3, which are LL transmission queues. At this time, a corresponding one is selected from the transmission queues 213_LL1, 213_LL2, and 213_LL3, on the basis of the results of categorization of the MAC frame including the latency conditions demanded of the MAC frame (data).

Then in step S35, the CSMA/CA execution unit 212_LL executes CSMA/CA. At this time, the CSMA/CA execution unit 212_LL waits for transmission in accordance with an amount of time defined by the access parameters, while judging the state of the channel by carrier sense. In step S36, the CSMA/CA execution unit 212_LL then judges that a transmission right for that channel has been acquired on the basis of there being no transmission of wireless signals by another terminal or the like while waiting transmission. Thus, CSMA/CA is executed until a transmission right for a certain channel is acquired.

Upon a transmission right being acquired in step S36 for the channel, in step S37 the CSMA/CA execution unit 212_LL takes out the MAC frame from the LL transmission queue, and performs output thereof to the wireless signal processing unit 202. The order of taking out MAC frames (data) from the respective transmission queues 213_LL1, 213_LL2, and 213_LL3 and so forth at this time is decided in the same way as one of the above described embodiment and so forth. Then in step S38, the wireless signal processing unit 202 converts the MAC frame into wireless signals, and transmits the wireless signals.

Also, in step S39, the data categorizing unit 211 inputs the MAC frame to a corresponding one of the transmission queues 213_VO, 213_VI, 213_BE, and 213_BK, which are non-LL transmission queues. A corresponding one of the transmission queues 213_VO, 213_VI, 213_BE, and 213_BK is selected at this time on the basis of the results of categorization of the MAC frame (data).

Then in step S40, a corresponding one of the CSMA/CA execution units 212_VO, 212_VI, 212_BE, and 212_BK performs CSMA/CA. At this time, CSMA/CA is executed in the same way as in step S35, except for the access parameters being different. Then in step S41, the corresponding one of the CSMA/CA execution units 212_VO, 212_VI, 212_BE, and 212_BK judges that a transmission right has been acquired for a certain channel, in the same way as in step S36. Thus, CSMA/CA is executed until a transmission right for a certain channel is acquired.

Upon the transmission right for the channel being acquired in step S41, the data collision management unit 215 judges in step S42 whether or not the channel regarding which the transmission right has been acquired by CSMA/CA for a corresponding one of the non-LL transmission queues has also had a transmission right acquired by CSMA/CA for an LL transmission queue as well. That is to say, whether or not the channel regarding which transmission of the non-low-latency data of the corresponding one of non-LL transmission queues is scheduled, is duplicate with a channel regarding which transmission of other low latency data of an LL transmission queue is scheduled, is judged. In a case in which the channel for the non-low-latency data is not duplicate with the channel for the low latency data, the processing advances to step S43. Conversely, in a case in which the channel for the non-low-latency data and the channel for the low latency data are duplicate, the processing stands by in step S42. That is to say, the data collision management unit 215 stands by for transmission of the non-low-latency data on the channel regarding which the transmission right has been acquired until transmission of the low latency data is completed.

Then in step S43, the corresponding one of the CSMA/CA execution units 212_VO, 212_VI, 212_BE, and 212_BK and the data collision management unit 215 take out the MAC frame from the corresponding one of the non-LL transmission queues, and performs outputs thereof to the wireless signal processing unit 202. Then in step S44, the wireless signal processing unit 202 converts the MAC frame into wireless signals, and transmits the wireless signals.

As described above, according to the embodiment, a plurality of LL transmission queues to each of which low latency data with stricter latency conditions regarding latency than predetermined latency conditions is input, are set in the terminal. Also, in the plurality of LL transmission queues, the latency conditions demanded of the input low latency data differ from each other. In the present embodiment, LL transmission queues are provided separately from the VO transmission queue that is one of the non-LL transmission queues. Accordingly, data regarding which real-time nature is demanded, such as RTA data or the like, i.e., data regarding which latency conditions regarding latency are stricter than predetermined latency conditions, is stored in one of the plurality of LL transmission queues. Thus, even in a case in which there is other VO data in the VO transmission queue or the like, latency of data regarding which real-time nature is demanded (low latency data) is suppressed to a low level. That is to say, the present embodiment can provide a wireless communication environment in which latency of data regarding which real-time nature is demanded can be appropriately suppressed to a low level.

Also, in the present embodiment, the low latency data is also categorized into a plurality of types, on the basis of demanded latency conditions. The low latency data is then input to one of a plurality of LL transmission queues corresponding to the types of categorization (LL1, LL2, LL3, etc.). By classifying the LL transmission queues input corresponding to the demanded latency conditions, realization of transmission control, in which low latency data is transmitted at an appropriate timing satisfying the demanded latency conditions, is facilitated.

Also, in the present embodiment, access parameters for CSMA/CA of the LL transmission queues are assigned in a state in which transmission of low latency data is prioritized in a relative manner over transmission of non-low-latency data. By prioritizing transmission of low latency data in a relative manner, latency of data regarding which real-time nature is demanded can be appropriately suppressed even lower.

Note that in the embodiment described above and so forth, one CSMA/CA execution unit 212_LL executes CSMA/CA regarding data of the plurality of LL transmission queues, but this is not limiting. In one modification, CSMA/CA is performed for low latency data regarding each of the transmission queues 213_LL1, 213_LL2, and 213_LL3 that are LL transmission queues. In this case, a CSMA/CA execution unit is provided for each LL transmission queue. Also, the access parameters may be assigned in a state in which transmission of wireless signals is prioritized in a relative manner in the order of LL1, LL2, and LL3. Note however, that in the present modification as well, access parameters for CSMA/CA of each of the LL transmission queues are assigned in a state in which transmission of wireless signals is prioritized in a relative manner over non-low-latency data.

Also, the number of LL transmission queues that the transmission control unit 203 sets is not limited to three, and is sufficient as long as the number thereof is a plurality. That is to say, the transmission control unit 203 may set two LL transmission queues, or may set four or more LL transmission queues.

Each of the processing in the embodiment described above can also be stored as a program that can be executed by a processor that is a computer. Additionally, storage thereof in a storage medium of an external storage device such as a magnetic disk, an optical disk, semiconductor memory, and so forth, may be performed, and distribution may be performed. The processor can then execute the above-described processing by reading in the program stored in the storage medium of the external storage device, and actions thereof being controlled by the program read in.

REFERENCE SIGNS LIST

1 Communication system
10 Access point
11 Processor
12 ROM
13 RAM
14 Wireless module
15 Router module
20 Terminal
21 Processor
22 ROM
23 RAM
24 Wireless module
25 Display
26 Storage
101 Data processing unit
102 Wireless signal processing unit
201 Data processing unit
202 Wireless signal processing unit
203 Transmission control unit
211 Data categorizing unit
212_LL, 212_VO, 212_VI, 212_BE, 212_BK CSMA/CA execution units
213_LL1, 213_LL2, 213_LL3, 213_VO, 213_VI, 213_BE, 213_BK transmission queues
215 Data collision management unit

The invention claimed is:

1. A terminal apparatus, comprising:
processing circuitry configured to:
set a plurality of low latency transmission queues, into each of which is input only low latency data, regarding which latency conditions relating to latency are stricter than predetermined latency conditions, the latency conditions demanded of the low latency data that is input being different from each other among the plurality of low latency transmission queues,
set a plurality of non-low latency transmission queues, into each of which is input only non-low latency data, which does not fall under the low latency data, access categories of the non-low latency data that is input being different from each other among the plurality of non-low latency transmission queues, the plurality of non-low latency transmission queues including a voice queue in which the non-low latency data categorized into voice is input and regarding which transmission has the highest priority out of the plurality of non-low latency transmission queues, transmission of the low latency data input in each of the plurality of low latency transmission queues being prioritized over the transmission of the non-low latency data input in the voice queue,
distinguish whether or not data falls under the low latency data by categorizing the data,
further categorize the data categorized into low latency data based on latency conditions that are demanded to the data, and thereby input the data to a corresponding one of the plurality of low latency transmission queues, on the basis of a result of categorizing,
further categorize the data categorized into non-low latency data based on an access category of the data, and thereby input the data to a corresponding one of the plurality of non-low latency transmission queues, on the basis of a result of categorizing,
perform CSMA/CA with collision prevention regarding prioritizing the low latency transmission queues when transmission rights of a same channel have been obtained for the low latency transmission queues and non-low latency transmission queues,
calculate a remaining time $\varepsilon$, with regard to the low latency data, by using a demanded latency time $\alpha1$, an input point-in-time $\alpha2$ to a corresponding one of the plurality of low latency transmission queues and a current point-in-time $\alpha3$, wherein $\varepsilon=\alpha1-(\alpha3-\alpha2)$,
set a degree of priority for the low latency data stored in each of the plurality of low latency transmission queues on a basis of the calculated remaining time $\varepsilon$, and
take out the low latency data stored in each of the plurality of low latency transmission queues in order of the degree of highness of the priority set.

2. The terminal apparatus according to claim 1, wherein the processing circuitry is configured to categorizes the data on the basis of any one of traffic type of the data, header information, and results of negotiation with an access point.

3. The terminal apparatus according to claim 1, wherein the processing circuitry is configured to assign access parameters for CSMA/CA regarding the plurality of low latency transmission queues and access parameters for CSMA/CA regarding each of the plurality of non-low latency transmission queues, in a state in which transmission of the low latency data is prioritized in a relative manner over transmission of the non-low-latency data.

4. A communication method comprising:
setting a plurality of low latency transmission queues, into each of which is input only low latency data, regarding which latency conditions relating to latency are stricter than predetermined latency conditions, the latency conditions demanded of the low latency data that is input being different from each other among the plurality of low latency transmission queues;
setting a plurality of non-low latency transmission queues, into each of which is input only non-low latency data, which does not fall under the low latency data, access categories of the non-low latency data that is input being different from each other among the plurality of non-low latency transmission queues, the plurality of non-low latency transmission queues including a voice queue in which the non-low latency data categorized into voice is input and regarding which transmission has the highest priority out of the plurality of non-low latency transmission queues, transmission of the low latency data input in each of the plurality of low latency transmission queues being prioritized over the transmission of the non-low latency data input in the voice queue;
distinguishing whether or not data falls under the low latency data, by categorizing the data;
further categorizing the data categorized into low latency data based on latency conditions that are demanded to the data, and thereby inputting the data to a corresponding one of the plurality of low latency transmission queues, on the basis of a result of categorizing;

further categorizing the data categorized into non-low latency data based on an access category of the data, and thereby input the data to a corresponding one of the plurality of non-low latency transmission queues, on the basis of a result of categorizing;

performing CSMA/CA with collision prevention regarding prioritizing the low latency transmission queues when transmission rights of a same channel have been obtained for the low latency transmission queues and non-low latency transmission queues;

calculating a remaining time $\varepsilon$, with regard to the low latency data, by using a demanded latency time $\alpha 1$, an input point-in-time $\alpha 2$ to a corresponding one of the plurality of low latency transmission queues and a current point-in-time $\alpha 3$, wherein $\varepsilon = \alpha 1 - (\alpha 3 - \alpha 2)$;

setting a degree of priority for the low latency data stored in each of the plurality of low latency transmission queues on a basis of the calculated remaining time $\varepsilon$; and taking out the low latency data stored in each of the plurality of low latency transmission queues in order of the degree of highness of the priority set.

5. A non-transitory storage medium storing a communication program, the communication program causing processing circuitry to execute:

setting a plurality of low latency transmission queues, into each of which is input only low latency data, regarding which latency conditions relating to latency are stricter than predetermined latency conditions, the latency conditions demanded of the low latency data that is input being different from each other among the plurality of low latency transmission queues;

setting a plurality of non-low latency transmission queues, into each of which is input only non-low latency data, which does not fall under the low latency data, access categories of the non-low latency data that is input being different from each other among the plurality of non-low latency transmission queues, the plurality of non-low latency transmission queues including a voice queue in which the non-low latency data categorized into voice is input and regarding which transmission has the highest priority out of the plurality of non-low latency transmission queues, transmission of the low latency data input in each of the plurality of low latency transmission queues being prioritized over the transmission of the non-low latency data input in the voice queue;

distinguishing whether or not data falls under the low latency data, by categorizing the data;

further categorizing the data categorized into low latency data based on latency conditions that are demanded to the data, and thereby inputting the data to a corresponding one of the plurality of low latency transmission queues, on the basis of a result of categorizing;

further categorizing the data categorized into non-low latency data based on an access category of the data, and thereby input the data to a corresponding one of the plurality of non-low latency transmission queues, on the basis of a result of categorizing performing CSMA/CA with collision prevention regarding prioritizing the low latency transmission queues when transmission rights of a same channel have been obtained for the low latency transmission queues and non-low latency transmission queues;

calculating a remaining time $\varepsilon$, with regard to the low latency data, by using a demanded latency time $\alpha 1$, an input point-in-time $\alpha 2$ to a corresponding one of the plurality of low latency transmission queues and a current point-in-time $\alpha 3$, wherein $\varepsilon = \alpha 1 - (\alpha 3 - \alpha 2)$;

setting a degree of priority for the low latency data stored in each of the plurality of low latency transmission queues on a basis of the calculated remaining time $\varepsilon$; and taking out the low latency data stored in each of the plurality of low latency transmission queues in order of the degree of highness of the priority set.

* * * * *